United States Patent
Dahod et al.

(10) Patent No.: US 9,922,329 B2
(45) Date of Patent: Mar. 20, 2018

(54) DIGITALLY SECURED ELECTRONIC TITLES FOR PRODUCTS IN SUPPLY CHAINS

(71) Applicant: TraceLink, Inc., Wakefield, MA (US)

(72) Inventors: Shabbir M. Dahod, Andover, MA (US); Peter J. Spellman, Quincy, MA (US)

(73) Assignee: TRACELINK, INC., North Reading, MA (US)

( * ) Notice: Subject to any disclaimer, the term of this patent is extended or adjusted under 35 U.S.C. 154(b) by 1130 days.

(21) Appl. No.: 14/079,200

(22) Filed: Nov. 13, 2013

(65) Prior Publication Data

US 2014/0136431 A1    May 15, 2014

Related U.S. Application Data

(60) Provisional application No. 61/725,623, filed on Nov. 13, 2012.

(51) Int. Cl.
*G06Q 30/00* (2012.01)
*G06Q 10/08* (2012.01)

(52) U.S. Cl.
CPC ......... *G06Q 30/0185* (2013.01); *G06Q 10/08* (2013.01)

(58) Field of Classification Search
CPC . G06C 30/0185; G06Q 30/0185; G06Q 10/08
USPC .................................................. 705/1.1–912
See application file for complete search history.

(56) References Cited

U.S. PATENT DOCUMENTS

| | | |
|---|---|---|
| 5,135,313 A | 8/1992 | Bowman |
| 5,717,989 A | 2/1998 | Tozzoli et al. |
| 6,496,806 B1 | 12/2002 | Horwitz et al. |
| 6,535,129 B1 | 3/2003 | Petrick |
| 6,584,466 B1 | 6/2003 | Serbinis et al. |
| 6,778,872 B2 | 8/2004 | Jorgenson et al. |
| 6,996,543 B1 | 2/2006 | Coppersmith et al. |
| 7,156,305 B2 | 1/2007 | Swan et al. |
| 8,140,852 B2 | 3/2012 | Guenter et al. |
| 2002/0055821 A1 | 5/2002 | Martin et al. |
| 2002/0076819 A1 | 6/2002 | Bowman et al. |
| 2003/0004755 A1 | 1/2003 | Basch et al. |
| 2003/0074556 A1 | 4/2003 | Chapman et al. |
| 2003/0183683 A1 | 10/2003 | Stewart |

(Continued)

FOREIGN PATENT DOCUMENTS

| | | |
|---|---|---|
| JP | 2009-524128 A | 6/2009 |
| JP | 2009524128 A | 6/2009 |

(Continued)

OTHER PUBLICATIONS

International Search Report and Written Opinion for PCT/US2013/069870, dated Mar. 29, 2014.

*Primary Examiner* — Jonathan P Ouellette
(74) *Attorney, Agent, or Firm* — Steven M. Greenberg, Esq.; CRGO Law (57) ABSTRACT

Computer-implemented methods and systems are provided for inhibiting entry of unauthorized products in a supply chain. The methods and systems feature unique identifiers placed on products in the supply chain and Digitally Secured Electronic Titles (DSETs) for products. The DSETs are exchanged upon transfer of the products in the supply chain and tracked in an electronic registry.

18 Claims, 6 Drawing Sheets

Serial Number

Lot

Expiration Date

Manufacturer ID

Message Digest with Signature (56) References Cited

U.S. PATENT DOCUMENTS

| | | |
|---|---|---|
| 2003/0187873 A1 | 10/2003 | Paffe et al. |
| 2005/0187788 A1 | 8/2005 | Rivera |
| 2006/0106718 A1 | 5/2006 | Spellman et al. |
| 2009/0307032 A1 | 12/2009 | Tribe et al. |
| 2010/0153870 A1 | 6/2010 | Hoffman |
| 2010/0289627 A1* | 11/2010 | McAllister ........... G06Q 10/087 340/10.42 |
| 2011/0016318 A1 | 1/2011 | Syngkon et al. |
| 2011/0093113 A1 | 4/2011 | Sager et al. |
| 2011/0225101 A1 | 9/2011 | Dillon |
| 2012/0226907 A1 | 9/2012 | Hohberger et al. |
| 2012/0271773 A1 | 10/2012 | Pieri |

FOREIGN PATENT DOCUMENTS

| | | |
|---|---|---|
| KR | 20110038470 A | 4/2011 |
| WO | 2006/055046 A2 | 5/2006 |
| WO | 2009/081149 A1 | 7/2009 |
| WO | WO2009081149 A1 | 7/2009 |

* cited by examiner

DIGITALLY SECURED ELECTRONIC TITLES FOR PRODUCTS IN SUPPLY CHAINS

CROSS REFERENCE TO RELATED APPLICATION

This application claims priority from U.S. Provisional Patent Application No. 61/725,623 filed on Nov. 13, 2012 entitled DIGITALLY SECURED ELECTRONIC TITLES FOR PRODUCTS IN SUPPLY CHAINS, which is hereby incorporated by reference.

BACKGROUND

The present application relates generally to Digitally Secured Electronic Titles (DSETs) for products to inhibit the entry of counterfeit, stolen, and other illegal or unauthorized goods into a supply chain.

BRIEF SUMMARY OF THE DISCLOSURE

In accordance with one or more embodiments, a computer-implemented method is provided for inhibiting entry of unauthorized products in a supply chain. The method includes (a) electronically receiving, at a computer system, a digitally signed electronic title for a product from a first custodian of the product, the electronic title containing information on the product including a unique identifier that is indicated on the product, and creating an entry for the electronic title in an electronic registry indicating a state of the electronic title as being claimed by the first custodian; (b) for each transfer of the product from a custodian indicated in the electronic registry as claiming the electronic title to a subsequent custodian in the supply chain: (i) electronically receiving, at the computer system, the electronic title for the product from the custodian indicated in the electronic registry as claiming the electronic title when that custodian sends the product and the electronic title to a subsequent custodian, and updating the state of the electronic title in the electronic registry as being released; and (ii) electronically receiving, at the computer system, the electronic title for the product from the subsequent custodian after the subsequent custodian has received the electronic title and the product and has verified authenticity of the electronic title and matched the unique identifier indicated in the electronic title to the unique identifier indicated on the product, and updating the state of the electronic title in the electronic registry as being claimed by the subsequent custodian; and (c) once the product has been received by a custodian who is an end customer or once the product has been lost, stolen, or destroyed, updating the state of the electronic title in the registry as being closed.

A computer system in accordance with one or more embodiments includes at least one processor, memory associated with the at least one processor, and a program supported in the memory for use to inhibit entry of unauthorized products in a supply chain. The program contains a plurality of instructions which, when executed by the at least one processor, cause the at least one processor to: (a) electronically receive a digitally signed electronic title for a product from a first custodian of the product, the electronic title containing information on the product including a unique identifier that is indicated on the product, and create an entry for the electronic title in an electronic registry indicating a state of the electronic title as being claimed by the first custodian; (b) for each transfer of the product from a custodian indicated in the electronic registry as claiming the electronic title to a subsequent custodian in the supply chain: (i) electronically receive the electronic title for the product from the custodian indicated in the electronic registry as claiming the electronic title when that custodian sends the product and the electronic title to a subsequent custodian, and update the state of the electronic title in the electronic registry as being released; and (ii) electronically receive the electronic title for the product from the subsequent custodian after the subsequent custodian has received the electronic title and the product and has verified authenticity of the electronic title and matched the unique identifier indicated in the electronic title to the unique identifier indicated on the product, and update the state of the electronic title in the electronic registry as being claimed by the subsequent custodian; and (c) once the product has been received by a custodian who is an end customer or once the product has been lost, stolen, or destroyed, update the state of the electronic title in the registry as being closed.

DETAILED DESCRIPTION

Counterfeit, stolen and other illegal or unauthorized goods can enter a supply chain through diversion. Diversion is the illegal purchase and sale of goods not permitted in the supply chain. Preventing diversion eliminates the means by which counterfeiters, thieves, and diverters can profit from the sale of illegal or unauthorized goods in the supply chain. The present application is directed to methods and systems for inhibiting diversion using unique identifiers placed on goods and DSETs created for the goods. The goods and DSETs are exchanged upon sale of goods in the supply chain.

The DSETs reference the unique identifiers that are also placed on the goods. The DSETs can optionally also include other characteristics about the goods. DSETs are typically created by the goods manufacturer (or other originator) of the goods using Private Keys, which inhibit tampering and forging of the DSETs. Recipients of the DSETs can verify their authenticity using Public Keys issued by the goods manufacturer.

Each time goods are sold, the seller will send the goods to the purchaser and also transmit the DSETs associated with the goods. The purchaser will verify the authenticity of the DSETs (using a public key) and compare the information in the DSETs with the information placed on the goods. If either the authenticity check fails or the verification of the information fails, then the goods are considered unauthorized and prevented from entering the supply chain. Every subsequent purchase and sale follows the same procedure to inhibit the entry of illegal or unauthorized goods from the supply chain at any level in the supply chain.

Figure 1:
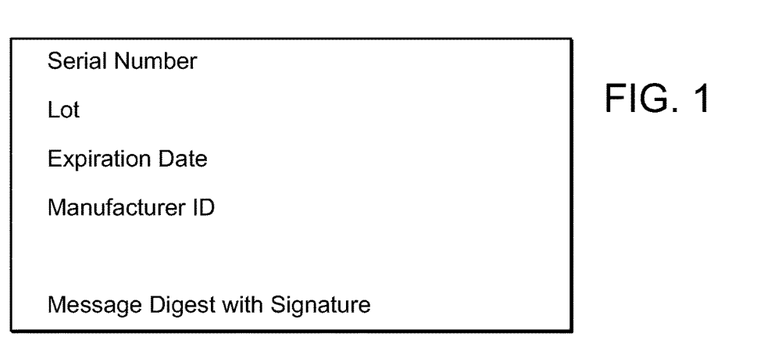
FIG. 1 is a simplified representation of a DSET in accordance with one or more embodiments.

FIG. 1 is a simplified representation of a DSET in accordance with one or more embodiments. A DSET is structured information about a serialized product digitally signed by the manufacturer. The information has a structured format such as, e.g., XML and derivatives, ANSI X.12, and delimiter separated formats. The DSET includes a serial number (or other unique identifier), which matches a serial number imprinted on the product or on the product's packaging. The serial number is unique for the manufacturer and can be in a variety of formats (e.g., GS1 SGTIN). The DSET can further include other attributes of the product (e.g., lot, expiration date, manufacturer ID). The Manufacturer ID is a globally unique identifier for the manufacturer (e.g., GS1 GLN). The message digest and signature are computed as part of the digital signing process. The DSET is digitally signed using the private key of the manufacturer, establishing authenticity of the DSET.

Figure 2:
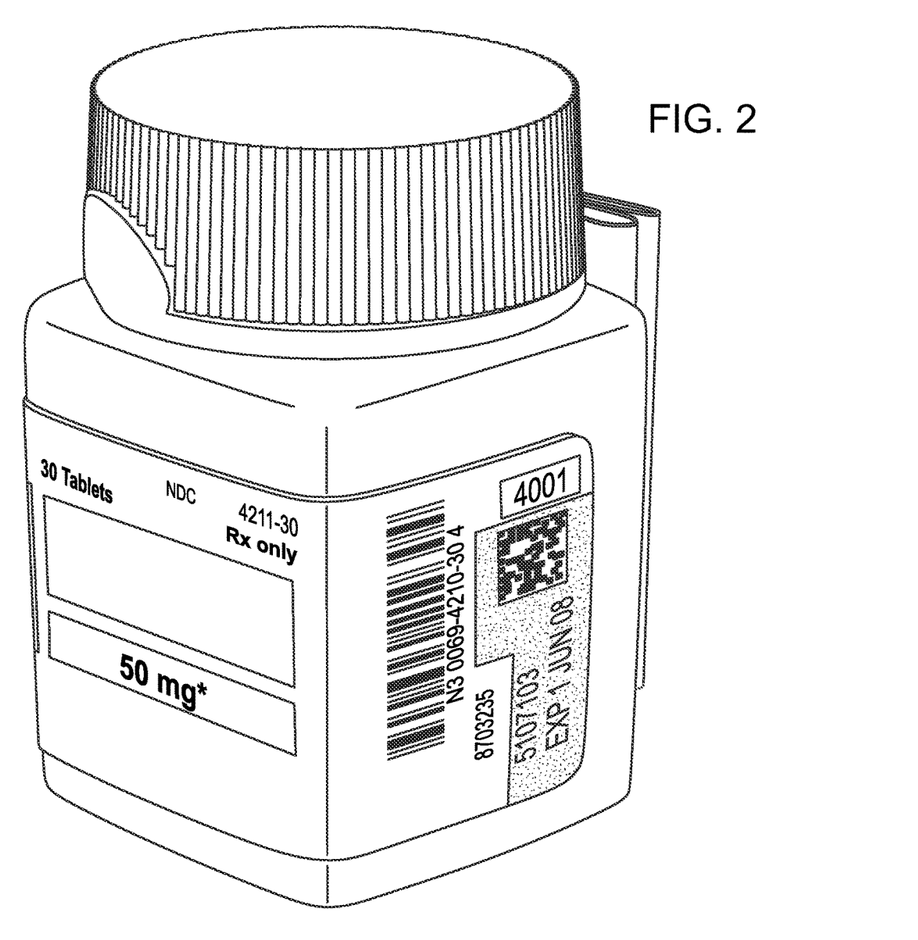
FIG. 2 illustrates one example of a product with a unique serial number printed on the product label, which is referenced in a DSET for the product.

FIG. 2 illustrates one example of a product with a unique serial number printed on the product label. The serial number can be in a human-readable format or any machine-readable format such as, e.g., a linear bar code, a data matrix bar code, a radio frequency identification (RFID) tag, and a magnetic strip. In the FIG. 2 example, the serial number is shown in a data matrix barcode. There is a unique serial number for each individual unit of product, e.g., a bottle as shown in the figure or alternately on a package containing multiple products. The serial number is referenced in the DSET for the product.

Figure 3:
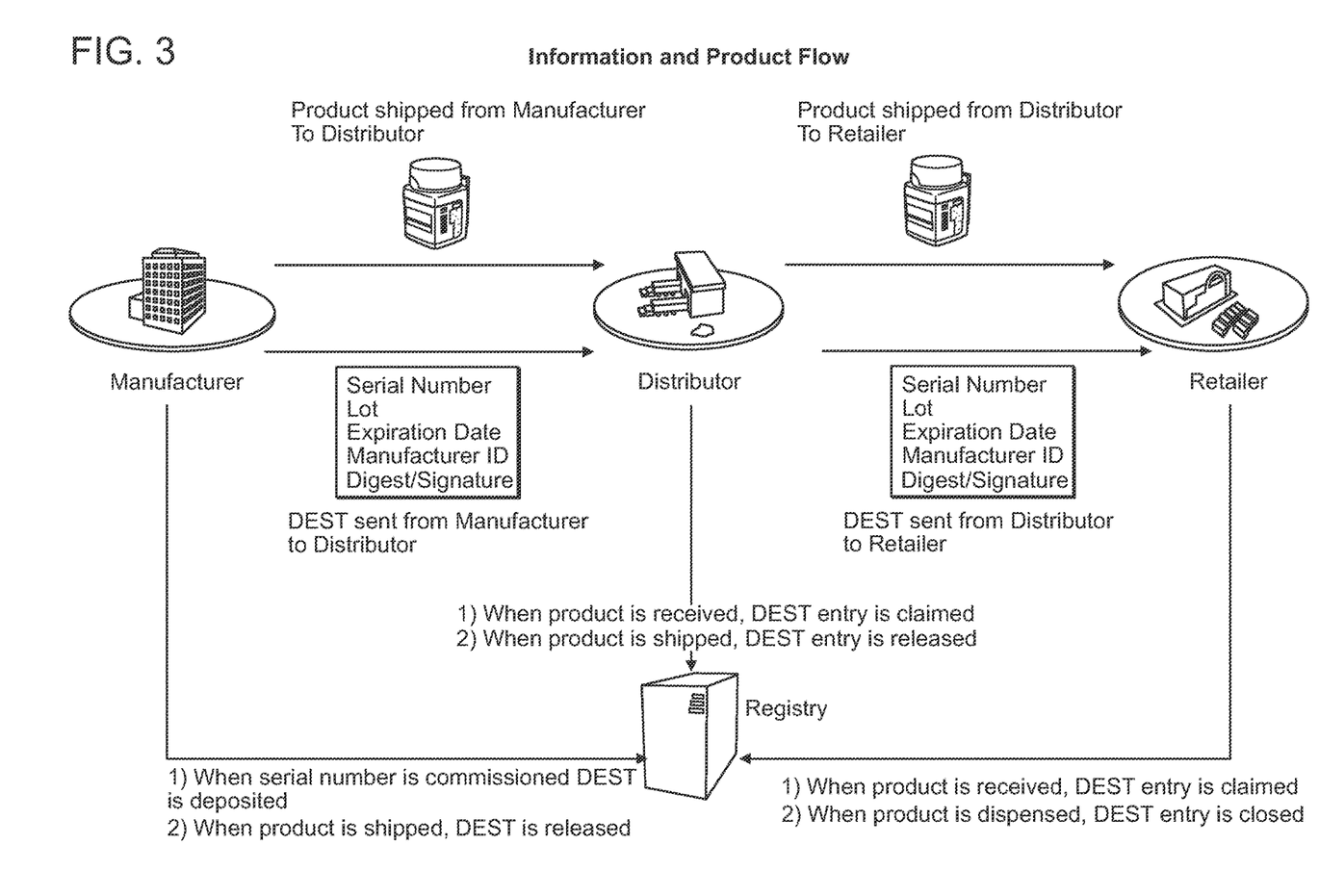
FIG. 3 is a simplified diagram illustrating product and DSET process flow in accordance with one or more embodiments.

FIG. 3 is a simplified diagram illustrating product and DSET process flow in accordance with one or more embodiments. The product and DSET traverse the supply chain from custodian to custodian. The state of the DSET is updated in a DSET registry to counteract duplication of DSETs.

Figure 4:
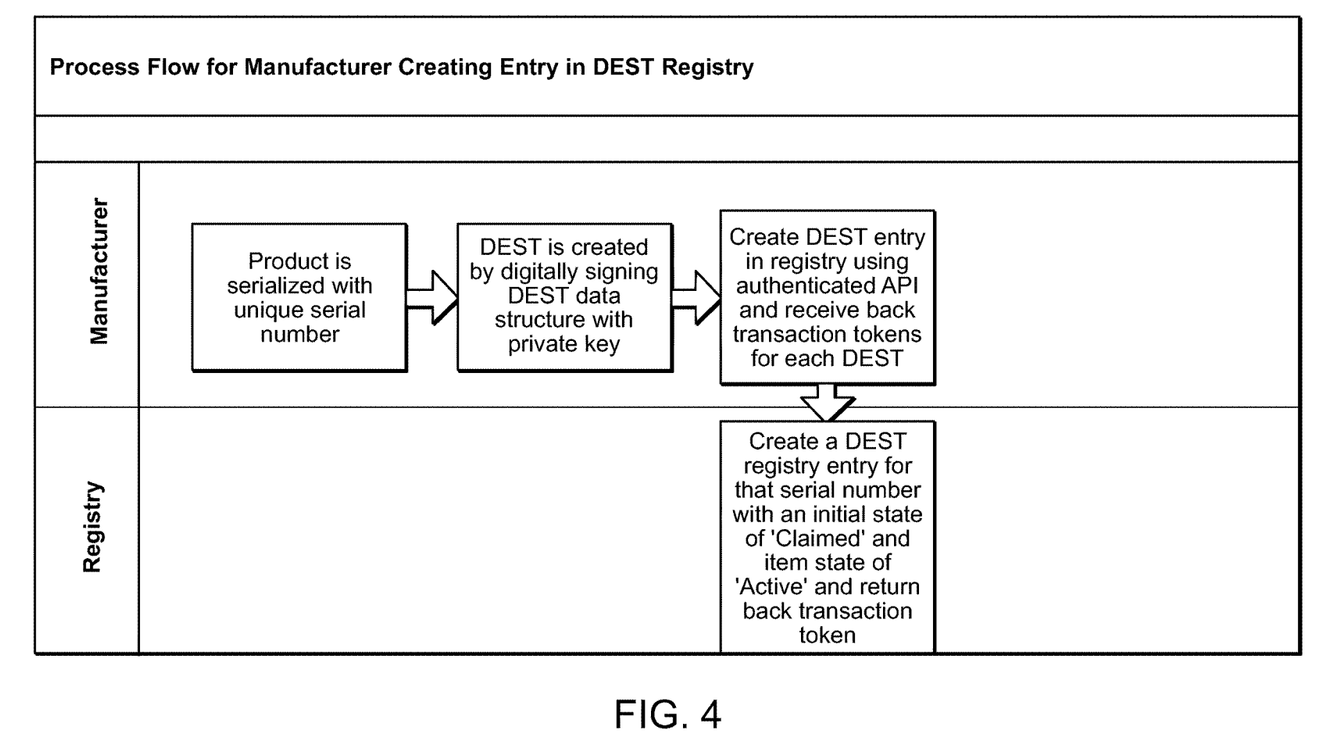
FIG. 4 illustrates an exemplary process flow for a manufacturer creating an entry in a DSETs Registry in accordance with one or more embodiments.

FIG. 4 illustrates an exemplary process flow for a manufacturer creating an entry in a DSETs Registry. Once the manufacturer has serialized products with a unique serial number, but prior to shipping the products, the manufacturer registers the DSET with the registry.

Figure 5:
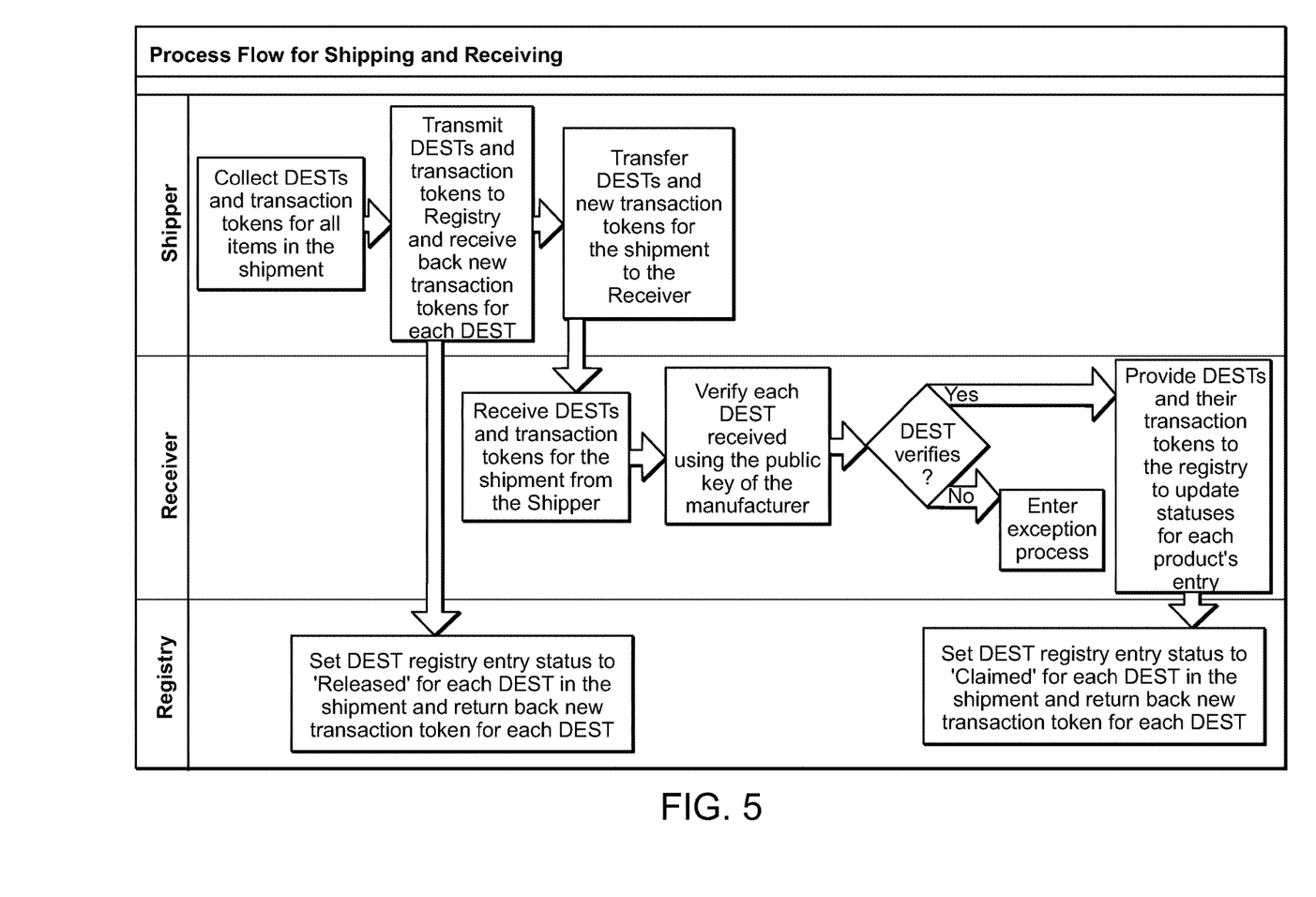
FIG. 5 illustrates an exemplary process flow for shipping and receiving products in accordance with one or more embodiments.

FIG. 5 illustrates an exemplary process flow for shipping and receiving goods. This figure describes the processing steps with the DSETs and interaction with the registry. The shipper provides the DSETs and releases the entry in the registry. The receiver verifies the DSETs via the public key and claims the entry in the registry to complete the transaction.

Figure 6:
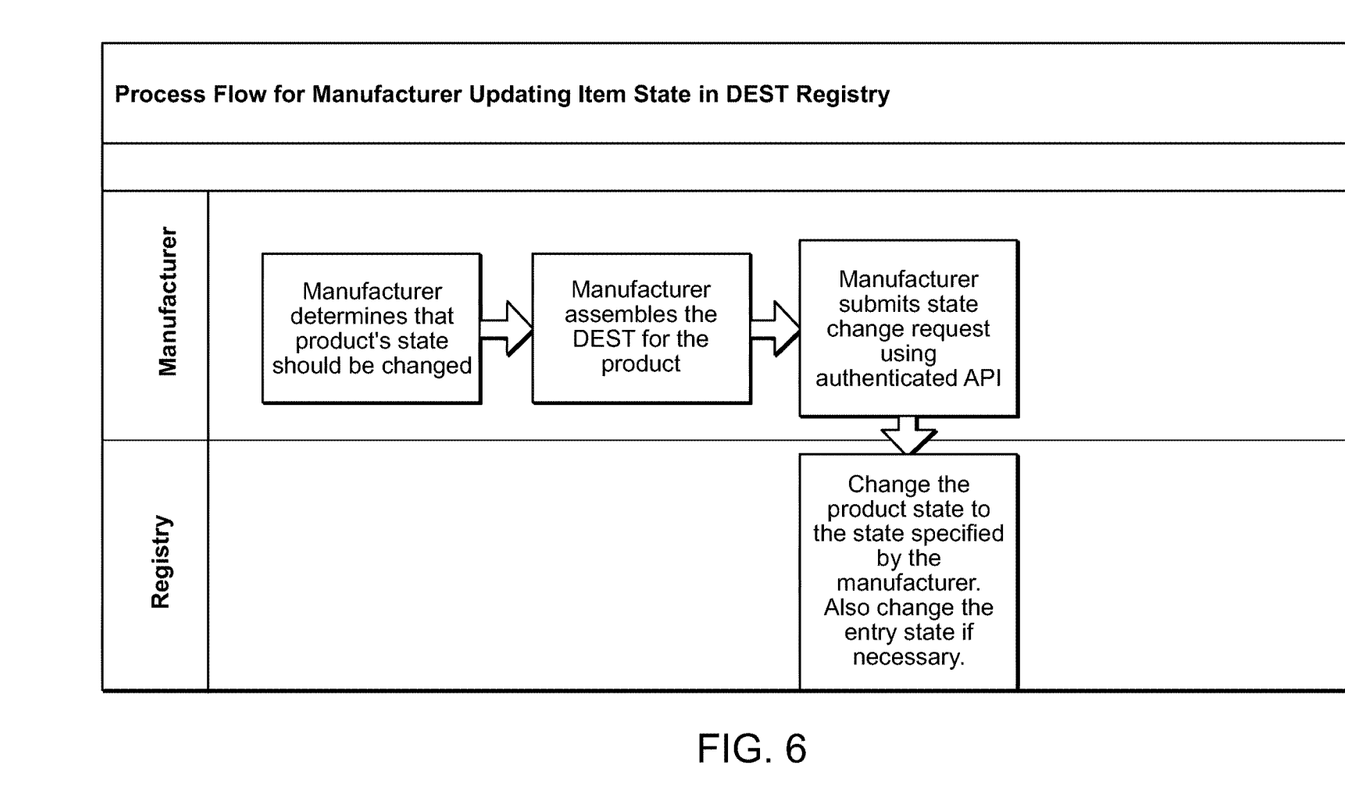
FIG. 6 illustrates an exemplary process flow for a manufacturer updating item state in a DSETs Registry in accordance with one or more embodiments.

FIG. 6 illustrates an exemplary process flow for a manufacturer updating item state in a DSETs Registry. In the event that a product must have its state altered in the registry (e.g., the product is stolen or recalled), the manufacturer uses an authenticated API (ensuring that it is in fact the manufacturer making the request) to set the state of the product and to potentially inhibit its further distribution in the supply chain.

Figure 7:
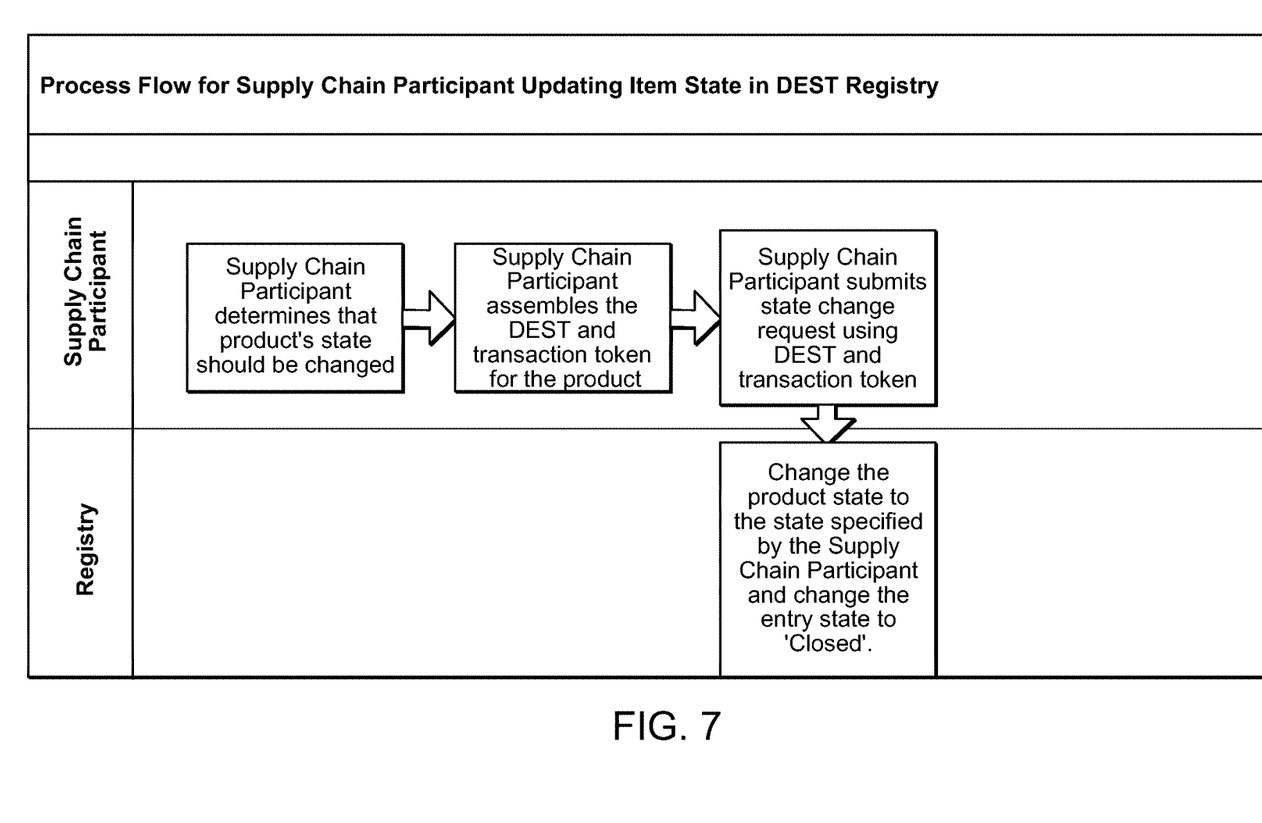
FIG. 7 illustrates an exemplary process flow for a supply chain participant updating product state in a DSETs Registry in accordance with one or more embodiments.

FIG. 7 illustrates an exemplary process flow for a supply chain participant updating product state in a DSETs Registry. At some point during the normal course of events, a product should no longer be in the supply chain (e.g., it is dispensed to a patient or destroyed). A supply chain partner interacts with the registry to change the product state to the correct state, e.g., dispensed, and the DSET entry in the registry to "closed."

The DSETs are created by the product manufacturer (or other product originator) who creates a DSET for every product. The DSET and product are linked by serial number. The manufacturer digitally signs the DSET with its private key, which verifies authenticity of the DSET.

An optional DSET Registry (Registry) may be implemented to counter the creation of duplicate DSETs and manage the state transitions on the product. There may be a plurality of registries, but the manufacturer (or other product originator) is associated with exactly one registry. At any point in time, there can only be one custodian for the product and therefore one active custodian of the DSET. The DSET itself and an optional transaction token are required to modify the Registry state. Additionally, the authentication required to modify the DSET entry is the DSET itself and the transaction token, so the registry need not have any knowledge about the requesting party. This ensures that trade secrets around product movement are not shared as a result of processing DSETs.

Each transfer of product from shipper to receiver entails the electronic transfer of the DSET for that product from shipper to receiver, as well as updating of the Registry entry for that product, first by the shipper to release the DSET for the product and then by the receiver to claim the DSET for the product.

If at any point in the supply chain, the product is destroyed or dispensed, the state of the DSET in the registry should be set to closed.

Exemplary Process Flow

The following describes exemplary technical steps in using DSETs in accordance with one or more embodiments.

1. The manufacturer (or other product originator) creates a private/public key pair.
2. The manufacturer makes the public key publicly available to the supply chain. The public key can be obtained, e.g., from a trusted source using Manufacturer ID or serial number. Alternately, the public key can be obtained from the manufacturer directly.
3. The manufacturer registers with a DSET Registry. Verification of identity of the manufacturer signing up for the registry can be handled by the registry provider. The manufacturer can get credentials for accessing manufacturer API in the registry. The manufacturer can get access to manufacturer API in the registry.
4. Upon product commissioning (serial number added to product) or any point before shipment, the manufacturer creates a DSET by creating a structured data fragment (e.g., in XML) containing information about the product (as illustrated in FIG. 1—at least the serial number, but also optionally including other information about the product like manufacturer ID, expiration date, and lot) and digitally signing it with the company's private key referenced in #1. In one or more embodiments, the DSET indicates which public key should be used by a custodian to verify authenticity of the DSET as products in the supply chain may originate from many manufacturers and furthermore each manufacturer may use multiple private keys. The public key information could be integrated in the serial number or alternatively in the manufacturer ID or may be separately provided in the DSET.
5. The manufacturer then deposits the DSET in the registry using the authenticated API, which creates a registry entry for it. The registry returns back to the manufacturer a transaction token for each DSET. (See FIG. 4).

6. Prior to shipment of product, the shipper (the manufacturer in the initial case) releases the registry entry for the DSET using the DSET and the transaction token. The registry returns back a new transaction token to be sent to the receiver with the DSET to allow them to update the registry entry. (See FIG. 5).

7. The shipper then electronically transfers the DSET and the transaction token to the receiver. Mechanisms for transfer include, but are not limited to, Advance Shipment Notices or EPCIS events delivered, for instance, via AS2 or Web services. (See FIG. 5).

8. For each DSET received from the shipper, the DSET is verified using the digital signature. If the digital signature verification is successful, the receiving party may claim the DSET entry in the registry and receive the product.

9. The receiver claims each DSET in the registry by presenting the DSET and its transaction token to the registry. This marks the entry as claimed and prohibits anyone else from claiming it.

10. At time of shipment to another party, steps 6-9 are repeated.

11. If at any time the current holder of the DSET dispenses (or otherwise sells to an end consumer) or destroys the product, that party sets the state of the product to the appropriate value and signals the closure of the entry in the registry by presenting the DSET and the transaction token to the registry.

12. The manufacturer may change the state of the DSET entry in the registry or the state of the product itself in the registry using the authenticated API.

Exemplary DSETs Registry States

There are two concepts of state in the DSETs registry. The first is the state of the entry, the second is the state of the product referenced by the DSET (by serial number).

An entry in the Registry is can have the following states:
  Claimed—Used when the product is in possession of a custodian.
  Released—Used when a product is en route from one custodian to another.
  Closed—Used when the product has reached a terminal state.
  Additional states may be utilized as business requirements evolve.

A product referenced by an entry in the registry can have the following states:
  Active—The product is active in the supply chain.
  Recalled—The product has been recalled.
  Stolen—The product has been stolen. This is a terminal state.
  Dispensed—The product has been dispensed to a patient. This is a terminal state.
  Destroyed—The product has been destroyed. This is a terminal state.
  Additional states may be utilized as business requirements evolve.

Permitted product states for a supply chain partner to set are:
  Dispensed.
  Destroyed.
  Stolen.
  Additional states may be utilized as business requirements evolve.

Supply Chain participants may only modify a registry entry if the product state is 'Active'. If the product is in a terminal state, no modifications to the registry entry or the product state are permitted by Supply Chain participants.

Manufacturers may modify the entry or product state at any time and to any value.

DSET Registry Transactions Tokens

Each operation updating a registry entry uses a transaction token and the DSET to perform and returns a new transaction token for that DSET.

The next operation on the registry entry uses the transaction token and the DSET (and will return a new transaction token). This ensures only one party is entitled to act on the entry.

Transaction tokens are transferred with the DSETs to the next supply chain partner for operating on the registry.

An optional implementation would be to solely use the token without DSET.

Registry Discovery

The DSET Registry is an Internet accessible service. As such, the IP address and port for the service should be available to the supply chain. The address/port pair can be determined by the following ways:
  Lookup via Manufacturer ID with a trusted authority.
  Present the Manufacturer ID (e.g., GLN) to a trusted authority, which will return the IP/port pair for the Manufacturer's registry.
  Lookup via serial number with a trusted authority. Present the serial number to a trusted authority, which will return the IP/port pair for the Manufacturer's Registry.
  Statically configure the IP/Port pair in an application that will process DSETs.

Public Key Acquisition And Selection For Verification

Central to the ability of verifying DSETs is the ability to acquire public keys and know which key to use for which DSET. Possible methods for supply chain partners to acquire public keys provided by the manufacturers are:
  Obtain public key from trusted source using Manufacturer ID.
  Obtain public key from trusted source using serial number.
  Obtain public key from manufacturer directly.

To determine which public key to use to verify a specific DSET:
  Use the serial number from the DSET to determine the manufacturer and therefore the correct public key.
  Use the manufacturer ID in the DSET to determine the correct public key.

It should be understood that while use of DSETs is required in various embodiments, use of a DSET registry and tokens is optional. Thus, in some embodiments, the system for inhibiting diversion only uses DSETs. In alternate embodiments, the system uses DSETs and a DSET registry. In yet further alternate embodiments, the system uses DSETs, a DSET registry, and tokens.

The DSET registry is preferably implemented in a computer server system, which communicates with a plurality of client devices operated by the users of the system, including manufacturers and other supply chain participants. The client devices communicate with the system over a communications network, which may comprise any network or combination of networks including, without limitation, the Internet, a local area network, a wide area network, a wireless network, and a cellular network.

The client devices operated by users to access the system can comprise any computing device that can communicate with the computer server system including, without limitation, personal computers (including desktop, notebook, and tablet computers), smart phones, and cell phones.

The processes described above may be implemented in software, hardware, firmware, or any combination thereof. The processes are preferably implemented in one or more computer programs executing on a programmable computer (which can be part of the server computer system) including a processor, a storage medium readable by the processor (including, e.g., volatile and non-volatile memory and/or storage elements), and input and output devices. Each computer program can be a set of instructions (program code) in a code module resident in the random access memory of the computer. Until required by the computer, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer server system may comprise one or more physical machines, or virtual machines running on one or more physical machines. In addition, the computer server system may comprise a cluster of computers or numerous distributed computers that are connected by the Internet or another network.

Accordingly, the foregoing description and attached drawings are by way of example only, and are not intended to be limiting.

What is claimed is:

1. A computer-implemented method for inhibiting entry of unauthorized products in a supply chain, comprising:
   (a) electronically registering at a computer system a multiplicity of different manufacturers each manufacturing one or more corresponding products and electronically receiving, at the computer system, from each of the different manufacturers for each of the corresponding products, a digitally signed electronic title signed with a corresponding private key of a corresponding manufacturer, the electronic title containing information indicating a public key paired with the private key used to sign the electronic title and information on a corresponding one of the products including a unique identifier that is indicated on the corresponding one of the products, creating by the computer system an entry for each received one of the electronic titles in an electronic registry and returning in response to each received electronic title from a corresponding one of the different manufacturers, returning a transaction token to the corresponding one of the different manufacturers;
   (b) receiving from one of the different manufacturers upon shipment of a corresponding product, an electronic title and an associated transaction token for a particular one of the different products and responding to the receipt of the electronic title and associated transaction token by issuing a new transaction token in the computer system and transmitting the new transaction token to the one of the different manufacturers;
   (c) receiving the new transaction token and associated electronic title from a first custodian thereby indicating a state of the associated electronic title as being claimed by the first custodian to the particular one of the products and updating the registry to indicate that the associated electronic title has been claimed by the first custodian;
   (d) for each transfer of the particular one of the products from a custodian indicated in the electronic registry as claiming the associated electronic title to a subsequent custodian in the supply chain:
   (i) electronically receiving, at the computer system, the associated electronic title for the particular one of the products from the custodian indicated in the electronic registry as claiming the associated electronic title when that custodian sends the particular one of the products and the associated electronic title to a subsequent custodian, and updating the state of the associated electronic title in the electronic registry as being released; and
   (ii) electronically receiving, at the computer system, the associated electronic title for the particular one of the products from the subsequent custodian after the subsequent custodian has received the associated electronic title and the particular one of the products and has verified authenticity of the associated electronic title and matched the unique identifier indicated in the associated electronic title to the unique identifier indicated on the particular one of the products, and updating the state of the associated electronic title in the electronic registry as being claimed by the subsequent custodian; and
   (e) once the particular one of the products has been received by a custodian who is an end customer or once the particular one of the products has been lost, stolen, or destroyed, updating by the computer system the state of the associated electronic title in the registry as being closed.

2. The method of claim 1, wherein other custodians in the supply chain verify the authenticity of the associated electronic title using a corresponding public key provided by the first custodian.

3. The method of claim 1, wherein each of the electronic titles comprises a structured file format.

4. The method of claim 1, wherein the associated electronic title further contains information on lot number, expiration date, and manufacturer identification for the particular one of the products.

5. The method of claim 1, wherein the unique identifier comprises a serial number, and wherein the serial number is indicated in a human-readable format or a machine-readable format.

6. The method of claim 1, further comprising providing an authenticated application programming interface (API) enabling custodians to request changes in the state of a product in the electronic registry.

7. The method of claim 1, further comprising verifying the identity of the first custodian and registering the first custodian in the electronic registry prior to step (a).

8. The method of claim 1, wherein steps (d)(i) and (d)(ii) further comprise electronically receiving, at the computer system, a transaction token with the electronic title for the product.

9. The method of claim 1, wherein each custodian accesses the computer system over the Internet.

10. A computer system, comprising:
   at least one processor;
   memory associated with the at least one processor; and
   a program supported in the memory for use to inhibit entry of unauthorized products in a supply chain, the program containing a plurality of instructions which, when executed by the at least one processor, cause the at least one processor to:
   (a) electronically registering at a computer system a multiplicity of different manufacturers each manufacturing one or more corresponding products and electronically receiving, at the computer system, from each of the different manufacturers for each of the corresponding products, a digitally signed electronic title signed with a corresponding private key of a corresponding manufacturer, the electronic title containing information indicating a public key paired with the private key used to sign the electronic title and information on a corresponding one of the products including a unique identifier that is indicated on the corresponding one of the products, creating by the computer system an entry for each received one of the electronic titles in an electronic registry and returning in response to each received electronic title from a corresponding one of the different manufacturers, returning a transaction token to the corresponding one of the different manufacturers;
   (b) receiving from one of the different manufacturers upon shipment of a corresponding product, an electronic title and an associated transaction token for a particular one of the different products and responding to the receipt of the electronic title and associated transaction token by issuing a new transaction token in the computer system and transmitting the new transaction token to the one of the different manufacturers;
   (c) receiving the new transaction token and associated electronic title from a first custodian thereby indicating a state of the associated electronic title as being claimed by the first custodian to the particular one of the products and updating the registry to indicate that the associated electronic title has been claimed by the first custodian;
   (d) for each transfer of the particular one of the products from a custodian indicated in the electronic registry as claiming the associated electronic title to a subsequent custodian in the supply chain:
      (i) electronically receiving, at the computer system, the associated electronic title for the particular one of the products from the custodian indicated in the electronic registry as claiming the associated electronic title when that custodian sends the particular one of the products and the associated electronic title to a subsequent custodian, and updating the state of the associated electronic title in the electronic registry as being released; and
      (ii) electronically receiving, at the computer system, the associated electronic title for the particular one of the products from the subsequent custodian after the subsequent custodian has received the associated electronic title and the particular one of the products and has verified authenticity of the associated electronic title and matched the unique identifier indicated in the associated electronic title to the unique identifier indicated on the particular one of the products, and updating the state of the associated electronic title in the electronic registry as being claimed by the subsequent custodian; and
   (e) once the particular one of the products has been received by a custodian who is an end customer or once the particular one of the products has been lost, stolen, or destroyed, updating by the computer system the state of the associated electronic title in the registry as being closed.

11. The system of claim 10, wherein other custodians in the supply chain verify the authenticity of the electronic title using a corresponding public key provided by the first custodian.

12. The system of claim 10, wherein the associated electronic title comprises a structured file format.

13. The system of claim 10, wherein the associated electronic title further contains information on lot number, expiration date, and manufacturer identification for the particular one of the products.

14. The system of claim 10, wherein the unique identifier comprises a serial number, and wherein the serial number is indicated in a human-readable format or a machine-readable format.

15. The system of claim 10, wherein the system provides an authenticated application programming interface (API) enabling custodians to request changes in the state of a product in the electronic registry.

16. The system of claim 10, wherein the processor is further caused to verify the identity of the first custodian and register the first custodian in the electronic registry prior to (a).

17. The system of claim 10, wherein (d)(i) and (d)(ii) further comprise electronically receiving, at the computer system, a transaction token with the electronic title for the product.

18. The system of claim 10, wherein each custodian accesses the computer system over the Internet.

\* \* \* \* \*